United States Patent [19]

Sanderford

[11] Patent Number: 4,546,785
[45] Date of Patent: Oct. 15, 1985

[54] PRESSURE TRANSLATOR AND SYSTEM FOR MEASURING PRESSURE

[75] Inventor: Dorsey W. Sanderford, Houston, Tex.

[73] Assignee: Cybar Corporation, Houston, Tex.

[21] Appl. No.: 433,408

[22] Filed: Oct. 7, 1982

Related U.S. Application Data

[63] Continuation-in-part of Ser. No. 310,274, Oct. 9, 1981, abandoned.

[51] Int. Cl.[4] ............................................. G05D 16/00
[52] U.S. Cl. ........................................ 137/85; 73/701; 73/706; 73/716; 137/240; 137/247; 251/65
[58] Field of Search ................. 73/701, 706, 714, 715, 73/716, 756; 137/82, 85, 239, 240, 247; 251/65, 80

[56] References Cited

U.S. PATENT DOCUMENTS

| | | | |
|---|---|---|---|
| 2,234,798 | 3/1941 | Craig | 137/247 X |
| 2,693,933 | 11/1954 | Meinke | 251/65 |
| 2,729,223 | 1/1956 | Rosenberger | 137/85 |
| 2,783,768 | 3/1957 | Smoot | 137/82 X |
| 2,825,361 | 3/1958 | Seljos | 137/85 X |
| 2,837,286 | 6/1958 | Ross | 137/85 X |
| 2,986,126 | 5/1961 | Werts | 137/82 X |
| 3,047,234 | 7/1962 | Fortier | 137/85 X |
| 3,134,260 | 5/1964 | Johnston | 73/716 X |
| 3,163,981 | 1/1965 | Goodall et al. | 137/82 X |
| 3,229,721 | 1/1966 | Bingel | 251/80 X |
| 3,274,833 | 9/1966 | Ollivier et al. | 73/701 |
| 3,415,123 | 12/1968 | Broughton | 73/706 |
| 3,416,408 | 12/1968 | Freiberger | 137/82 X |
| 3,491,599 | 1/1970 | Baumann | 137/85 X |
| 3,661,164 | 5/1972 | Kreuter et al. | 137/85 |
| 3,939,712 | 2/1976 | Jurovsky et al. | 137/85 X |
| 4,077,261 | 3/1978 | Ring et al. | 73/706 |
| 4,082,002 | 4/1978 | Baugh | 73/756 |

Primary Examiner—Gerald A. Michalsky
Attorney, Agent, or Firm—Fleit, Jacobson, Cohn & Price

[57] ABSTRACT

A pressure translator for converting a process pressure into a pneumatic signal which can be transmitted and measured by a pressure measurement device at a remote location. The pressure translator provides isolation for the process and the measuring equipment but still translates the process pressure with very high accuracy. The pressure translator employs a balanced valve in cooperation with a forced balanced diaphragm.

35 Claims, 11 Drawing Figures

PRESSURE TRANSLATOR AND SYSTEM FOR MEASURING PRESSURE

CROSS REFERENCE TO RELATED APPLICATION

This application is a continuation-in-part of copending application Ser. No. 310,274, filed Oct. 9, 1981, now abandoned.

BACKGROUND OF THE INVENTION

1. Field of the Invention

The present invention relates to pressure translators, in general, and to a pressure translator for use in converting a process pressure into a pneumatic measurement signal, in particular.

2. Background of the Prior Art

Pressure translators find application in such areas as pressure measurement, density measurement, fluid level measurement, and other areas where it is desirable to measure volume, flow or weight of fluids. In making such measurements, it is desirable not to interfere with the structure or system in which the fluid to be measured is being kept. In avoiding such interference, the process itself is protected.

Among the known measurement devices are those employing radiation, bubbling or sonic techniques. All of these devices add to or disturb the process fluid being measured. For certain fluids, radiation contamination and fluid component damage are real problems.

Thus, there is a need for a pressure translator for converting process pressure into a pneumatic signal which can be transmitted and measured by a pressure measurement device at a remote location. The present invention is directed toward filling that need.

SUMMARY OF THE INVENTION

The present invention relates to a pressure translator for converting a process pressure into a pneumatic signal which can be transmitted and measured by a pressure measurement device at a remote location. The pressure translator provides isolation for the process and the measuring equipment but still translates the process pressure with very high accuracy. The pressure translator employs a balanced valve in cooperation with a forced balanced diaphragm in order to accomplish the pressure translation.

The pressure translator basically comprises a hollow body portion within which is disposed a translator plate that divides the body cavity into an input chamber and an output chamber. The translator plate has one or more bores defined within the plate and extending from one surface of the plate to the other. A diaphragm is associated with and completely covers each of the translator plate surfaces, which are configured in such a way that each surface, together with the planar diaphragm, forms a volume of generally frustoconical shape with the diaphragm acting as the base. The frustoconical volumes together with the series of bores define a fluid reservoir. The diaphragm contained in the input chamber is referred to as an input diaphragm, whereas the diaphragm contained in the output chamber is referred to as an output diaphragm.

The input chamber has provisions for receiving fluid from a process vessel. In turn, the output chamber has provisions for receiving an output signal tube and a valve assembly. The valve assembly in turn contains an input to which is secured one end of an air supply line. In this way, it is possible to inject air or testing fluid through a fixed orifice or restrictor into the output chamber by way of the valve assembly.

The valve assembly is constructed to have three valve chambers disposed in line. A valve seat is defined between each two adjacent chambers. Defined within the centrally positioned valve chamber is a vent port which permits the chamber to communicate with atmosphere. A fluid conduit is defined in the valve assembly so that the air supply may be directed to each of the valve chambers located on either side of the central valve chamber. The air supply is also in fluid communication with the output chamber. Movably mounted within the three valve chambers is a valve stem to which is secured a pair of valve heads, one associated with each of the valve seats. In a preferred embodiment each of the valve heads is in the shape of a ball.

To operate the pressure translator, a process pressure is applied to the input chamber and an air pressure under constant flow, as regulated by the fixed orifice, is introduced into the output chamber via the valve assembly. Under these conditions, the input diaphragm is forced toward the translator plate, causing the fluid in the fluid reservoir to move to the other side of the translator plate. This causes the output diaphragm and an attached operator disc to move away from the translator plate. Since the valve stem is connected directly to the operator disc, the valve stem assembly moves to close both valves. Closing the valves causes pressure in the output chamber to increase. When the output chamber pressure is equal to the process pressure, the movement of the fluid within the fluid reservoir stops and the valves vent the proper air to maintain a pressure in the output chamber equal to the process pressure. When the pressure is decreased in the input chamber, the reverse action takes place, thereby reducing the pressure in the output chamber to equal the input process pressure, thus giving rise to a pressure signal.

The pressure signal is transmitted via the output of the output chamber to a remote measurement device. The measurement device is of the type that does not require flow of air in order to produce a reading. The pressure translator is used as part of a closed system and no air movement other than the movement of the sensing element in the transducer or the gauge of the measurement instrument takes place. Under these conditions, the pressure on one end of the pneumatic line at the measurement instrument will be exactly equal to the pressure in the output chamber.

Thus, it is a primary object of the present invention to provide an improved pressure translator.

It is another object of the present invention to provide a pressure translator for use in converting a process pressure into a pneumatic measurement signal.

It is a further object of the present invention to provide a balanced valve for use in a pressure translator.

It is still an object of the present invention to provide a forced balanced diaphragm for use in a pressure translator.

It is yet an object of the present invention to provide a pressure translator using a balanced valve coupled with a forced balanced diaphragm.

It is still a further object of the present invention to provide a pressure translator that gives highly accurate readings of process pressure through the use of noninvasive techniques.

These and other objects will become apparent when considered in connection with the following drawings and detailed description.

DETAILED DESCRIPTION OF THE INVENTION

Figure 1:
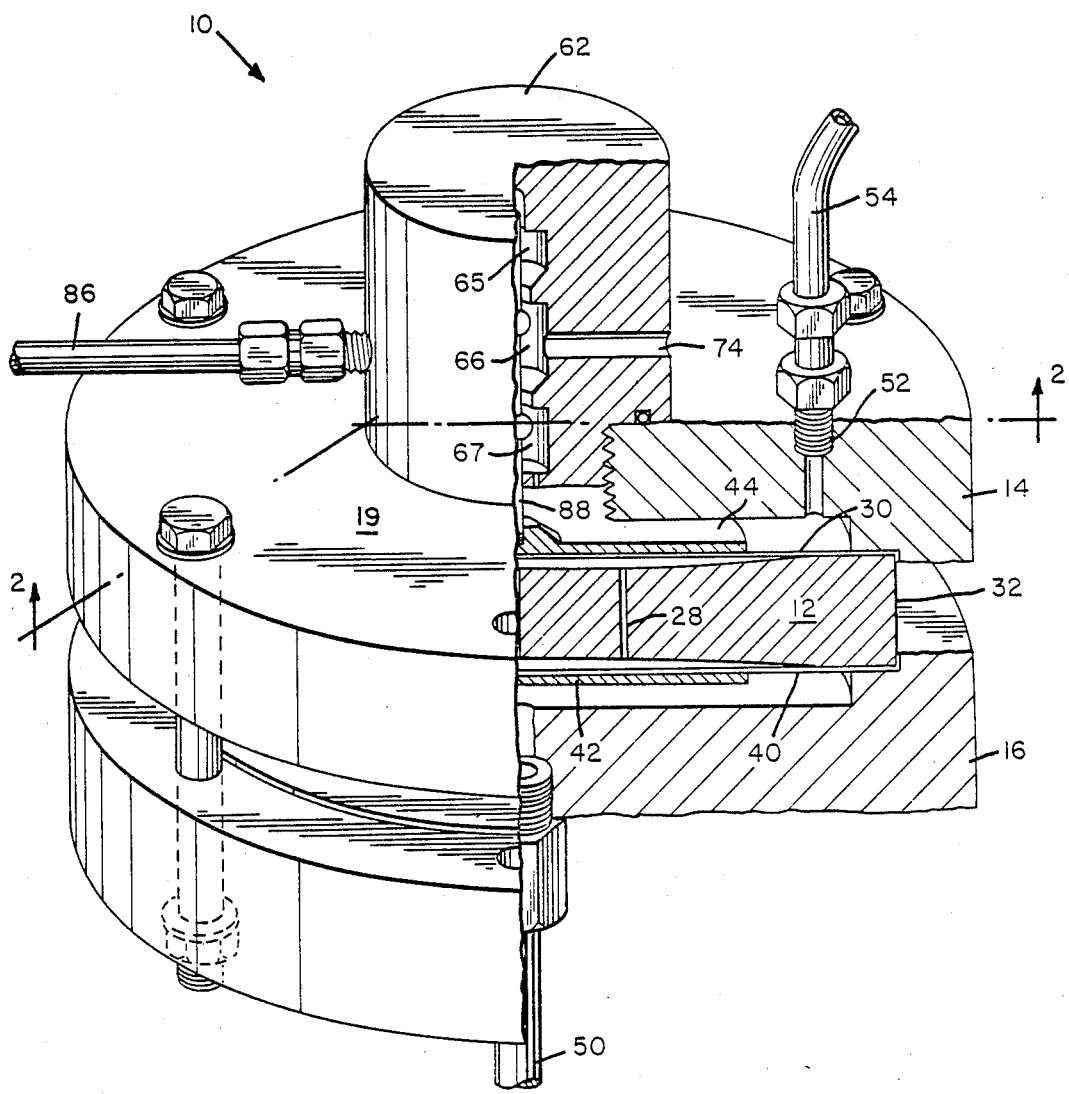
FIG. 1 is a perspective view of a pressure translator embodying the teachings of the present invention with a portion cut-away to reveal the interior structure of the translator.
Figure 2:
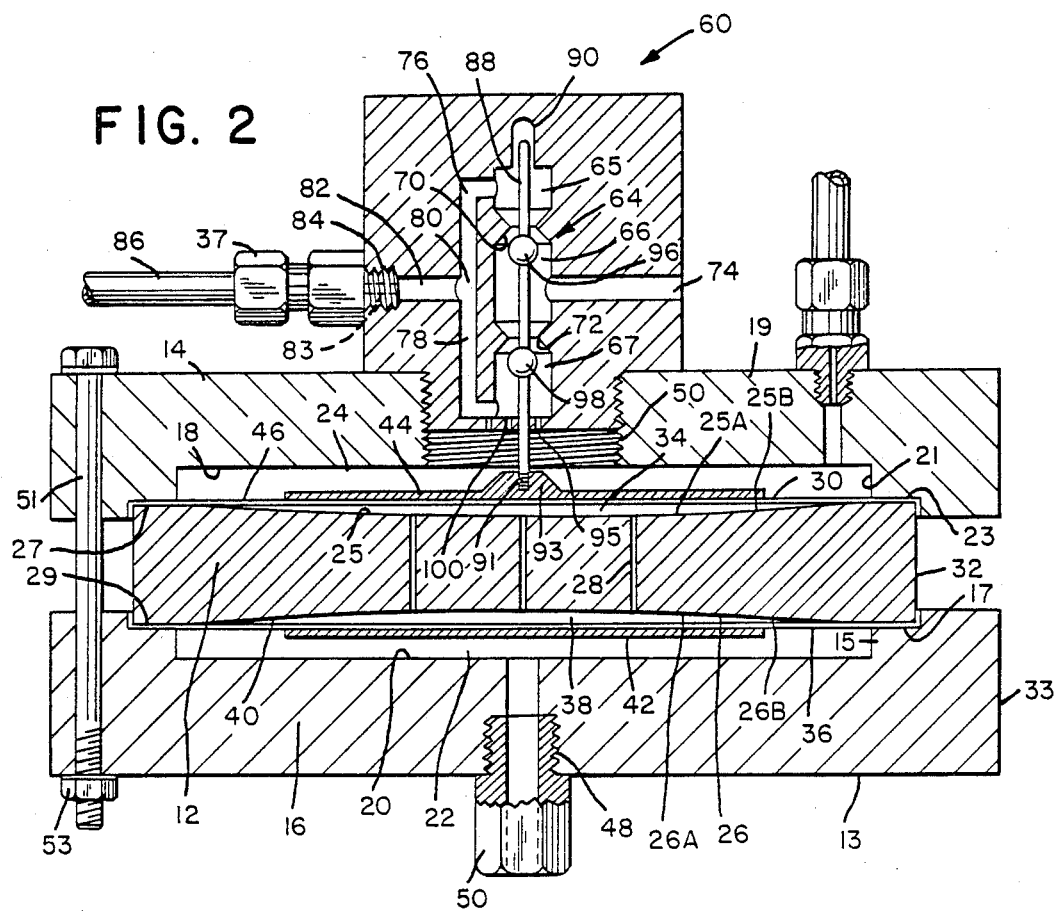
FIG. 2 is a view taken along lines 2—2 of FIG. 1.

As best seen in FIGS. 1 and 2, the pressure translator, generally designated as 10, basically comprises a generally disc-shaped translator plate 12 interposed between a pair of upper and lower discs 14 and 16. As oriented in FIG. 1, lower disc 16, which is made from metal or a high strength plastic, has a planar outer surface 13 defined on one side of the disc. The opposite side of the disc 16 contains a first concentric bore 15 of desired depth to define an evacuated volume 20. A depressed, polished lip 17 is formed about the periphery of the bore 15 to provide a ledge for the polished rim defined by the surface 26 of the translator plate 12. In like manner, upper disc 14, which is also made from metal or high strength plastic, has a planar outer surface 19 defined on one side of the disc. The opposite side of the disc 14 also contains a concentric bore 21 of desired depth to define an evacuated volume 18. As with disc 16, disc 14 has a depressed, polished lip 23 formed about the periphery of bore 21 to provide a ledge for the polished rim defined by the surface 25 of the translator plate 12.

The upper surface 25 of the translator plate is generally concave as is the bottom surface 26 of the translator plate 12. As with the discs 14 and 16, the translator is made from metal or a high strength plastic. In a preferred embodiment, the configuration of surface 25 is made up of two surfaces: a concentric planar surface 25A essentially parallel to and spaced from the plane defined by the upper rim 27 of the translator plate 12; and a ring 25B that tapers outwardly from the peripheral edge of surface 25A to the interior portion of the rim 27. The same may be said for surface 26 where 26A represents the concentric planar surface, 26B the ring and 29 denotes the rim.

One or more bores 28 provide fluid communication between the upper and bottom surfaces 25 and 26. The bores are typically 0.016 to 0.125 inches in diameter and may be arranged in any pattern, so long as the holes are located under the area covered by discs 42 and 44, the details of which are described hereinafter. An output diaphragm 30 made of a thin film, such as a strong plastic film (Mylar) or a thin metal foil (stainless steel or brass), completely covers the top surface 25 and is positioned about the perimeter 32 of the translator plate 12 so as to define the space generally designated as 34. As can be seen, space 34 is in the form of a frustoconical section with the planar diaphragm 30 providing the base. An input diaphragm 36 of similar structure to that of the output diaphragm is similarly positioned relative to the bottom surface 26 to define another frustoconical space 38. The diaphragms 30 and 36, which are typically of 0.002 inch thick Teflon, are sealed on their edges by the pressure created at the upper and lower rims 27 and 29 of the translator plate. This pressure is developed when the upper and lower discs 14 and 16 with the translator plate 12 and diaphragms 30 and 36 interposed therebetween are all held together by a series of fasteners, such as bolts 51 and nuts 53, disposed about the periphery of the translator 10. In a preferred embodiment, there are six such fasteners disposed about the periphery of the translator 10. The number of fasteners is determined by the pressure being measured. The greater the pressure the greater the number of bolts.

Preferably, the diaphragms 30, 36 are not stretched, but are permitted to lie flat as they are sealed on their edges at the upper and lower rims 27, 29 of the translator plate. The sealing arrangement is enhanced by ensuring that the rims are polished and the depressed lips 17 and 23 are likewise polished.

The entire interior volume defined by the spaces 34 and 38 as well as the series of bores 28 define a fluid reservoir that is filled with a non-compressible viscous fluid, such as silicone liquid, oil or water.

Secured to the surface 40 of the film 36 is a generally planar metallic drive disc 42. In like manner, a generally planar metallic output disc 44 is secured to the surface 46 of the film 30 associated with the second chamber 24. In a preferred embodiment the discs 42 and 44 are secured to their respective films 36 and 30 by conventional means such as vulcanizing or gluing with a contact cement.

The lower body portion 16 has defined therein a through bore 48 extending from atmosphere to the interior of chamber 22. The bore 48, which is typically located concentric relative to the periphery 33 of the disc, is threaded to receive one end of an input tube 50 whose other end is connected to a process vessel (110 in FIG. 4) so as to provide fluid communication between the fluid within the process vessel and the input chamber 22.

Defined at the center of the upper body portion 14 is a bore 50 threaded to receive a valve assembly 60. Also defined in the upper body portion 14 is a through bore 52 extending from atmosphere to the interior of output chamber 24. The bore 52, which is typically located parallel to and spaced from the cylindrical axis of the disc 14, is threaded to receive a conventional coupling 35 associated with a tube 54, the other end of which is connected to a pressure measurement device (120 in FIG. 4) at a remote location. Through the connection with tube 54, fluid communication between the output chamber 24 and the remote measuring device is provided.

The valve assembly 60 basically comprises a valve body 62 within which is defined an elongated valve cavity 64. In a preferred embodiment, the valve body is generally cylindrically shaped. The valve cavity defines first, second and third chambers denoted 65, 66 and 67, respectively. The three chambers are arranged in line with chamber 66 being intermediate chambers 65 and 67. Within the elongated cavity, the valve body 62 defines a chamfered valve seat 70 between chambers 65 and 66 and a valve seat 72 between chambers 66 and 67. Typically the chamfer is from 30° to 45° from the longitudinal axis of the valve cavity 64. Defined within chamber 66 is a vent port 74 which permits chamber 66 to communicate with atmosphere.

Defined within the valve body 62 is a first fluid passageway 76 that originates at chamber 65. In like manner, a second fluid passageway 78, which originates from chamber 67, is defined within the valve body 62. The free ends of both fluid passageways 76 and 78 meet at a common junction 80 and are joined in fluid communication with a third conduit 82 that terminates at the exterior of the valve body in a threaded portion 84 for receiving a conventional coupling 37 associated with a hose 86, the other end of which is attached to a supply of fluid (130 in FIG. 4), such as air.

Figure 5A:
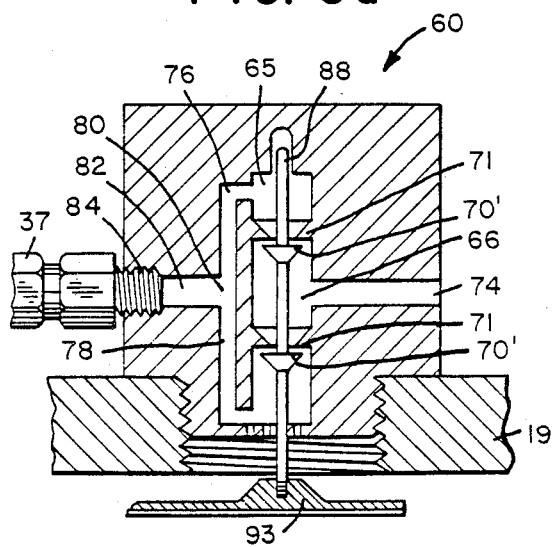
FIGS. 5a and 5b are views of the valve assembly of FIG. 2 with alternative valve seats and heads.
Figure 5B:
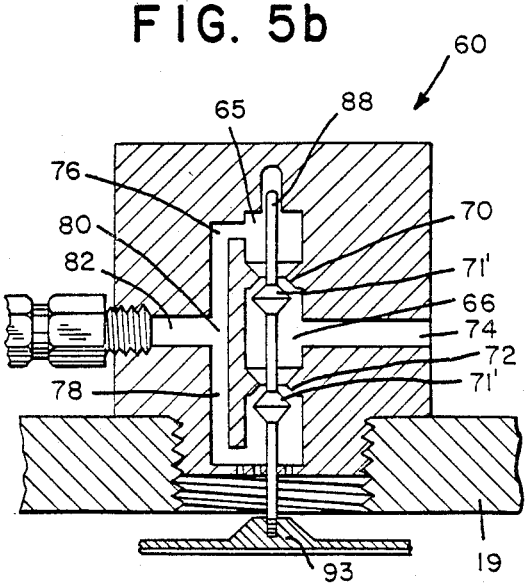

Positioned within the elongated cavity 64 is an elongated rod or valve stem 88. One end of the valve stem travels within a valve guide 90 defined as part of the end of the elongated cavity 64 where chamber 65 is defined. The other end of the stem 88, after passing through a suitable bushing 95 defined in the end of the cavity 64 where the chamber 67 is located, is secured to the operator disc 44 through the threaded end 91 of the stem 88 and threaded boss 93 formed as part of disc 44. Appropriately positioned along stem 88 is a pair of valve heads 96 and 98. Valve head 96 is associated with valve seat 70, whereas valve head 98 is associated with valve seat 72. In a preferred embodiment, each valve head is generally in the shape of a sphere. It is to be understood that other shapes are contemplated. For example, see FIG. 5a where each valve head is shown having a flat surface 71, associated with a flat valve seat 70'. Further, note FIG. 5b, where the valve heads define a frustoconical surface 71' associated with the chamfered valve seats 70 and 72.

Figure 4:
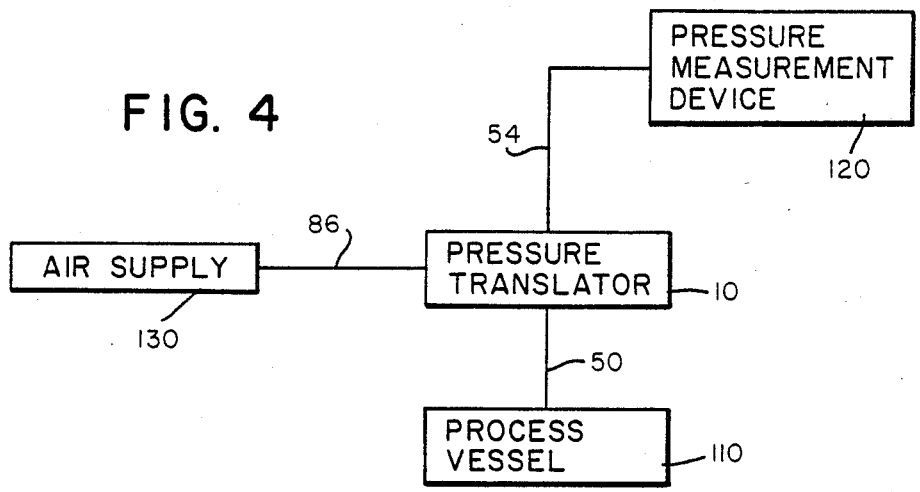
FIG. 4 is a block diagram of a measuring system employing the pressure translator of the present invention.

The operation of the pressure translator may be described in the following manner with general reference to FIGS. 2 and 4. In order to measure a parameter which fluctuates in accordance with the process pressure of a fluid in a vessel 110 associated with the process being performed, it is necessary to pass a portion of that fluid into the input chamber 22 of the pressure translator 10. This may be accomplished in either of two ways. An input tube 50 may be provided and fitted directly between the process vessel 110 and the lower body portion 16 of the pressure translator. In the alternative, the pressure translator may be incorporated into the structure defining the process vessel.

At the same time, air under pressure from an air supply 130 is introduced through the air supply line 86 into the valve assembly 60 via a fixed orifice 83 for eventual introduction into the output chamber 24. One such fixed orifice is the double screened jet made by Lee Company, Westbrook, Conn., and bearing product identification No. JET A 1872400H. The restrictor is screened at its input and output so that any contaminants in the air supply do not clog the orifice. It has been observed that, for maximum accuracy, a constant flow of air should be maintained through the valve assembly and the output chamber. This is accomplished by maintaining the supply of air pressure greater than the process pressure. It also has been determined that, when the air supply pressure is about one atmosphere (14.7 psi) greater than the process pressure, the most favorable results are obtained.

With the introduction of the process fluid and the air supply into the appropriate chambers, the operation of the pressure translator takes place as follows. When the process pressure is applied to the input chamber 22, the drive disc 42 and the input diaphragm 36 are forced toward the translator plate 12, causing the fluid between the diaphragm 36 to move to the other side of the translator plate. This causes the output diaphragm 30 and operator disc 44 to move away from the translator plate. The drive disc 42 covers the diaphragm 36 and protects it from damage caused by the entry of fluid into the input chamber 22 via tube 50. Because the drive disc 42 serves a safety function, it is desirable although not absolutely necessary to the present invention.

Since the valve stem 88 is connected directly to the operator disc, the valve stem assembly moves to cause the spherical valve heads 96 and 98 to press up against the valve seats 70 and 72 and thus close both valves (FIG. 3a) so that the air supply flows into the output chamber 24 as indicated by the arrows. Closing the valves causes pressure in the output chamber to increase. When the output chamber pressure is equal to the process pressure, the movement of the fluid within the fluid reservoir stops. In this way, the valve heads 96 and 98 are fixed relative to the valve seats 70 and 72 so that a portion of the air being introduced into the output chamber 24 through the fluid passage 100 is allowed to vent to atmosphere in the following manner with reference to FIG. 3b. The fluid passes through both fluid passageways 76 and 78 with the air in passageway 76 entering the chamber 65 and the air in passageway 78 entering chamber 67. Because of the space created between the valve heads and the valve seats, air is permitted to pass from chambers 65 and 67 into chamber 66 and from chamber 66 through air vent 74 out to atmosphere.

When the output chamber pressure is equal to the process pressure, the valves vent the proper air to atmosphere in order to maintain a pressure in the output chamber equal to the process pressure. When the pressure is decreased in the input chamber, the reverse action takes place, thereby reducing the pressure in the output chamber to equal the pressure within the input chamber. In particular, the operator disc 44 and the output diaphragm 30 are forced toward the translator plate 12, causing the fluid in volume 34 of the fluid reservoir to move into volume 32 via bores 28. This causes the output diaphragm to move toward the translator plate. Because the valve stem 88 is connected directly to the operator disc, the valve stem assembly moves to cause the valve heads 96 and 98 to move away from the valve seats 70 and 72 to open both valves and allow a portion of the fluid to flow out of the output chamber to atmosphere to equalize the pressure between the input and output chambers as shown in FIG. 3c.

Figure 6:
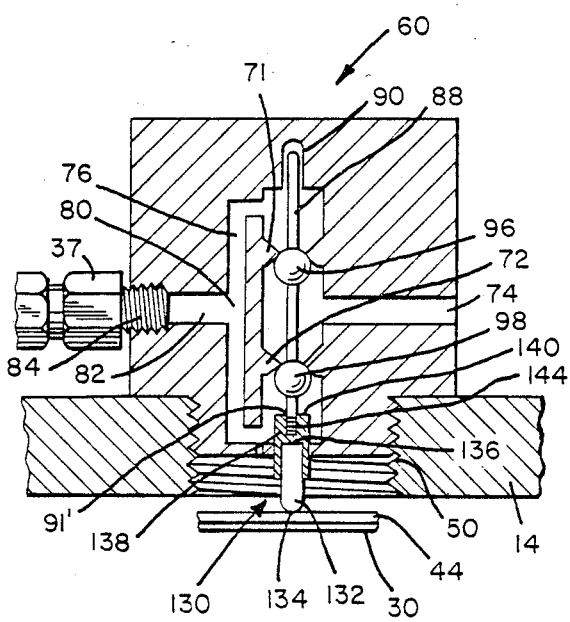
FIG. 6 is a view of the valve assembly of FIG. 2 with an alternative diaphragm connection assembly.

An alternative arrangement for the operative connection between the valve stem 88 and the operator disk 44 is illustrated in FIG. 6, where like reference numerals denote like elements.

As can readily be seen, the major difference between the connection as shown in FIG. 6 and the connection as illustrated in FIG. 2 is the replacement of the threaded boss 93 and the threaded end 91 with the magnetic assembly generally designated as 130 in FIG. 6.

In detail, the magnetic assembly 130 comprises a tiny cylindrical magnet 132 having a spherical end 134. The other end 136 of the magnet is received within a small metallic sleeve 138. The other end of the sleeve contains a threaded bore 140 that receives threaded portion 91' of the stem 88. Note that stem 88 is shortened to accommodate the structure associated with the magnetic assembly 130, and that the guide bushing 90 is eliminated with this construction so that the magnet has some freedom of lateral movement about the surface of the operator disk 44. To facilitate this movement, the operator disk contains a polished surface.

Figure 3A:
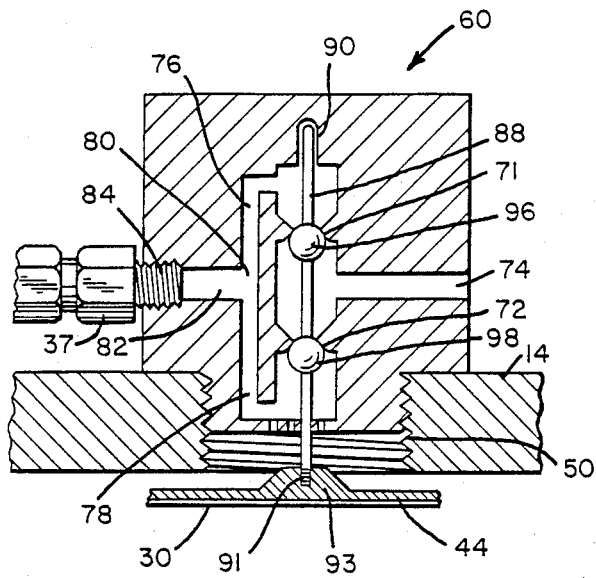
FIGS. 3a, 3b and 3c are views of the valve assembly as illustrated in FIG. 2 and are used to explain the operation of the assembly.
Figure 3B:
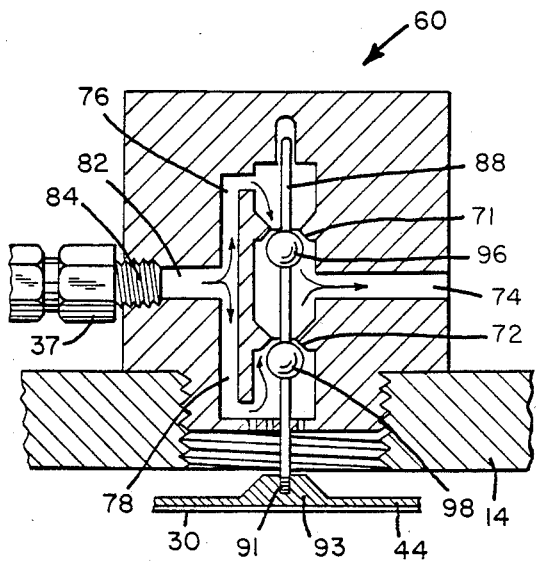
Figure 3C:
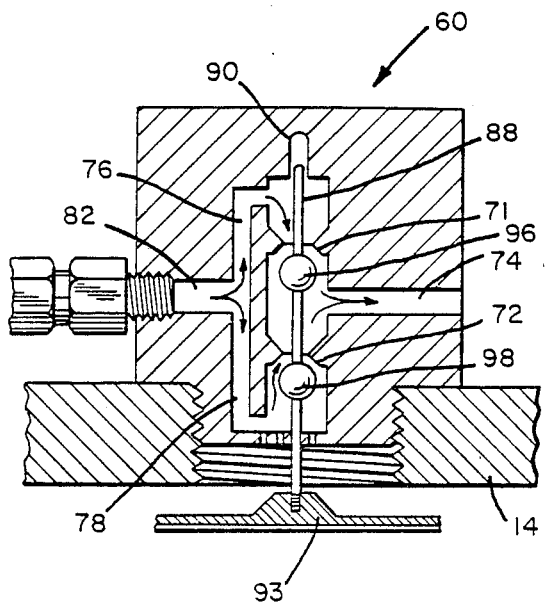

The valve stem with magnetic assembly 130 operates in a manner similar to that as previously described with reference to the alternative embodiment as shown in FIGS. 3a, 3b and 3c. In particular, the movement of the valve heads 96 and 98 in response to the movement of the diaphragm 30 is the same. The valve stem 88 with magnetic assembly 130 differs, however, in that the curved surface 134 is free to move about the polished surface of the operator disk 44 during alignment of the valve heads 96,98 within their respective valve seats 71 and 72. The magnetic properties of the magnet 132 are chosen so that the magnet remains in contact with the polished first metal disk 44 during operation of the valve stem.

Figure 7:
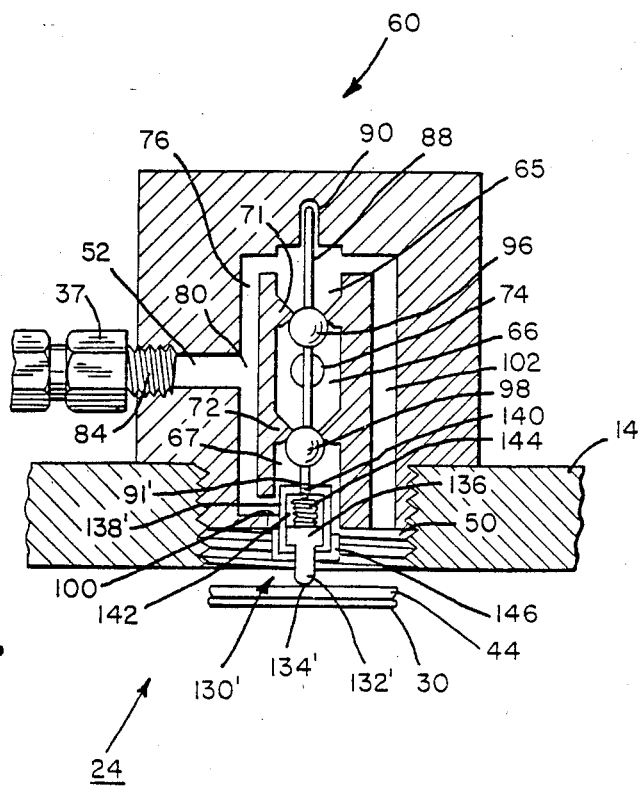
FIG. 7 is a fragmentary cross-sectional view of another embodiment of a valve assembly for a pressure translator in accordance with the present invention.

An alternative arrangement for the operative connection between the valve stem 88 and the operator disk 44 is illustrated in FIG. 7, where like reference numerals denote like elements. As there shown, the magnetic assembly 130' comprises a tiny cylindrical magnet 132' having a spherical end 134'. The other end 136 of the magnet is received within a small metallic sleeve 138'. The other end of the sleeve contains a threaded bore 140 that receives threaded portion 91' of the stem 88. Sleeve 138' includes a central bore 142 within which magnet 132' is slidably received. A spring 144 is positioned within bore 142 of sleeve 138' to bias magnet 132' in a downward direction against disk 44. As shown, magnet 132' is of smaller cross-sectional area adjacent spherical end 134' than it is at end 136 in order to define a shoulder, and it is retained by a cap 146 which can be press fitted on the lower end of sleeve 138' and which has an opening smaller than that of the shoulder to prevent magnet 132' from passing completely through the lower end of the sleeve. As in the FIG. 6 embodiment, stem 88 is shortened to accommodate the structure associated with the magnetic assembly 130', and the guide bushing 90 is eliminated so that the magnet has some freedom of lateral movement about the surface of the operator disk 44. To facilitate this movement, the operator disk contains a polished surface.

The valve stem with magnetic assembly 130' operates in a manner similar to that as previously described with reference to the embodiment shown in FIG. 6. In particular, the movement of the valve heads 96 and 98 in response to the movement of the diaphragm 30 is the same. The curved surface 134 is free to move about the polished surface of the operator disk 44 during alignment of the valve heads 96,98 within their respective valve seats 71 and 72. Spring 144 provides overload protection for the assembly illustrated in FIG. 6 in that further axial movement of magnet 132 can be accommodated within sleeve 138 up to the point where spring 144 is fully compressed. Preferably, spring 144 is provided with a preload of approximately one pound to insure firm contact with the surface of disk 44. Additionally, the magnetic properties of the magnet 132 are selected so that the magnet remains in contact with the polished first metal disk 44 during the full extent of operation of the valve stem.

Also as shown in FIG. 7, direct communication is provided between third chamber 67 and chamber 24 by means of passageways 100. Similarly, direct communication is provided between chamber 65 and chamber 24 by means of equalizing passageway 102, which extends therebetween and which does not intersect with vent port 74.

Figure 8:
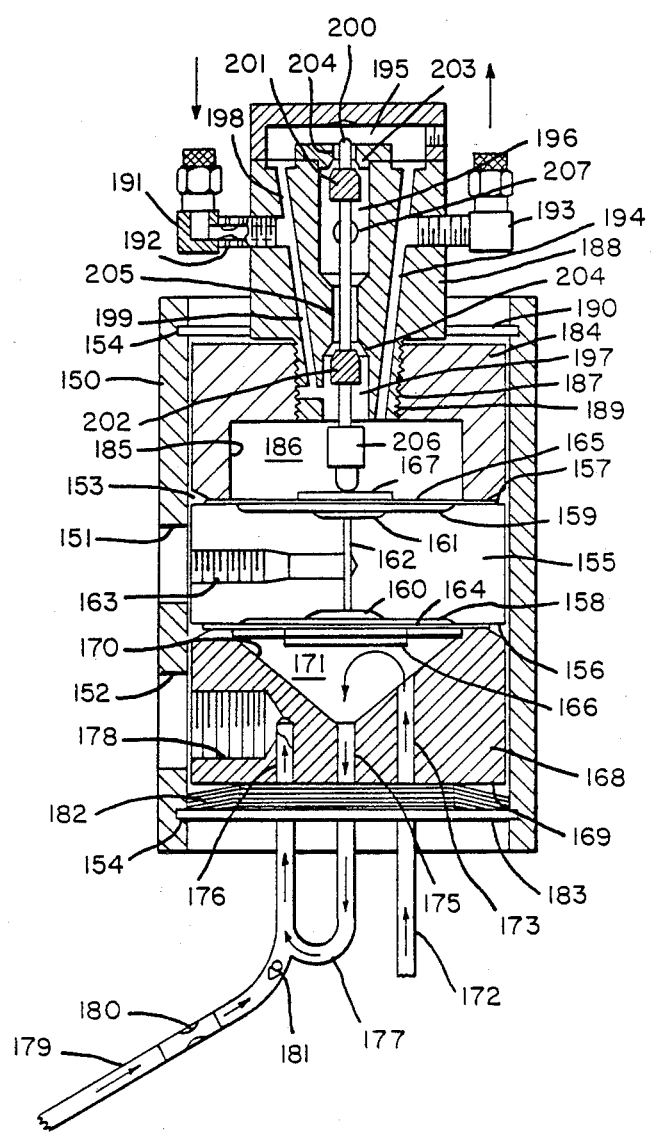
FIG. 8 is a fragmentary cross-sectional view of a further embodiment of a pressure translator in accordance with the present invention.

Another embodiment of the present invention is illustrated in FIG. 8, wherein the housing within which the translator is contained is of a different external and internal configuration to provide a translator having reduced size, weight and assembly time relative to the configuration illustrated in FIGS. 1 through 6. In the embodiment of FIG. 8a generally cylindrical translator housing 150 is provided, the housing being open at each end thereof, and including a pair of spaced radial openings 151, 152, the purpose for which will hereinafter be described. The housing includes a smooth internal bore 153 and an annular slot 154 formed in the bore adjacent each of the open ends thereof.

Positioned within housing 150 and generally centrally of the ends thereof is a translator plate 155 in the form of a disc having an annular input face 156 and an annular output face 157, each of the faces being flat and positioned perpendicular to the axis of plate 155. Inwardly of each of faces 156, 157 is a first generally coaxial depression 158, 159, respectively. Spaced inwardly of the first coaxial depression is a second coaxial depression 160 and 161, respectively. Interconnecting each of second depressions 160, 161, is an axial bore 162, which can be a single bore as shown, or it can be a plurality of generally axially positioned bores which serve to permit communication between the depressions. The outer periphery of translator plate 155 is so sized as to permit it to be snugly yet slidably received within bore 153, substantially in fluid-tight relationship therewith. Additionally, a radially positioned fill port 163 is provided and extends from the periphery of plate 155 to axial bore 162 in order to permit communication therebetween. Translator plate 155 is so positioned within housing 150 that fill port 163 is aligned with radial opening 151.

Positioned in overlying relationship with each of the depressions, and extending radially outwardly to input face 156 and output face 157 of the translator plate are flexible diaphragms 164,165, respectively, adjacent the outer faces of each of which is positioned a supporting disc 166, 167, respectively. As in the embodiments heretofore described, diaphragms 165, 167 can be made of a thin film, such as Mylar, Teflon, or a thin metal foil of stainless steel or brass. A diaphragm formed from Teflon film having a thickness of about 0.002 inches has been found to be particularly advantageous.

Positioned opposite input face 156 of the translator plate is an input chamber member 168, which is a generally disc-like structure having a substantially flat lower surface 169 and an upper surface including a generally axially positioned conical recess 170. An annular contact surface surrounds and is positioned radially outwardly of recess 170 and is disposed opposite annular input face 156 of the diaphragm. Recess 170 and diaphragm 164 define an input chamber 171, that communicates with a flushing conduit 172, through bore 173 which extends through input chamber member 168. Also positioned in the input chamber member are a pair of axially positioned bores 175, 176, which are connected to the respective legs of a U-shaped trap 177. Bore 175 extends through chamber member 168 from recess 171 to lower surface 169 while bore 176 extends only partially into member 168 and connects with a threaded aperture 178 that extends radially inwardly from the outer peripheral surface of input chamber member 168 and is adapted to receive a pressure fitting (not shown) which, in turn, is connected to the process pressure source. Aperture 178 is positioned opposite opening 152 to permit access thereto. U-shaped trap 177 is connected to a drip input conduit 179 that extends outwardly therefrom and which includes a restriction in the form of an orifice 180, which can be a Lee Jet orifice similar to that previously identified but designated Model 200H, and which also includes a check valve 181 that serves to permit flow only in the direction toward the U-shaped trap 177.

The input chamber member is supported axially by means of a plurality of disc springs 182 formed from flexible metallic material, which, in turn, rest on an inwardly extending retaining ring 183 positioned within annular slot 154. The disc springs are of an annular configuration to permit flushing conduit 172 and U-shaped trap 177 to interconnect with bores 173, 175 and 176, respectively.

An output chamber member 184 is positioned on the opposite side of translator plate 155 from input chamber member 168 and is also generally disc-shaped and adapted to be slidably positioned within bore 153. Output chamber member 184 includes a generally cylindrical recess 185 coaxial therewith and which extends radially outwardly to a point inwardly of the peripheral edge thereof to define output chamber 186. A threaded axial bore 187 is provided to receive a generally cylindrical valve body member 188 having an exteriorly threaded neck 189 adapted to mate with the internal threads in bore 187. A retaining ring 190 is positioned within annular slot 154 to prevent upward movement of output chamber member 184, and to provide an upper stop against which the force of disc springs 182 act through input chamber member 168, translator plate 155, and output chamber member 184.

Valve body 188 includes an air inlet connection 191 which incorporates a restriction 192 in the form of an orifice which can be, for example, an orifice manufactured by Lee Jet and identified by model number 400D. Positioned diametrically opposite air inlet 191 is an air outlet 193, which is connected to a suitable pressure measuring device (not shown). Within valve body 188 are positioned first chamber 195, second chamber 196, and third chamber 197, which are generally axially arranged in spaced relationship. Inlet 191 communicates with first chamber 195 by means of passageway 198 and with third chamber 197 and output chamber 186 by means of passageway 199. An equalizing passageway 194 extends from first chamber 195 to output chamber 186 in order to assist in equalization of the pressures within those respective chambers. Valve stem 200 carries spaced valve heads 201 and 202, which are engagable with valve seats 203 and 204, respectively. First and second chambers 195,196, respectively, are in communication by means of passageway 204, within which stem 200 is loosely carried while second and third chambers 196,197, respectively, are in communication by means of passageway 205, which also loosely carries stem 200. The innermost end of stem 200 includes a magnetic assembly 206, which can have the same parts and structure as magnetic assembly 130' illustrated in FIG. 7. Valve body 188 also includes a vent port 207 as is disclosed in connection with the earlier-described embodiments and which extends from second chamber 196 to vent the device to the atmosphere.

As will be appreciated, the operation of the embodiment illustrated in FIG. 8 is similar to that of the other embodiments hereinbefore described, and the same pressure balanced valve assembly is utilized. Additionally, however, a flush system is provided whereby cleaning fluid can be passed into input chamber 171 through flushing conduit 172 and is utilized to clean the process fluid from the input chamber by use of reverse flow. The position of check valve 181 prevents back flow through drip input conduit 179.

The drip system permits pressurized, clean fluid to pass through the orifice and check valve at a very slow rate and out through the input port. This small flow of clean fluid prevents process fluid from entering trap 177 and input chamber 171. If the clean fluid has a lower density than the process fluid, the clean fluid will be in the loop trap and prevent the process fluid from entering the input port at times when there is no pressure on the drip or the flush systems. The operation of the drip system involves closing the flush line by means of a suitable valve (not shown) or the like, and providing pressurized clean fluid to drip input conduit 179. The clean fluid passes through orifice 180, check valve 181 and fills inlet chamber 171, bore 175, U-trap 177 and bore 176. Because process fluid is kept from the input chamber, clogging of the device is eliminated. For example, in oil well drilling operations the process fluid can be a so-called drilling mud, which is a viscous, gummy material which tends to clog instruments after only a short period of operation. However, by providing as the clean fluid the base fluid used to prepare the drilling mud, such as water where water-based drilling muds are employed and diesel oil where oil-based drilling mud are employed, a clean, mud-compatible buffer fluid is used to transmit the process fluid pressure to the input chamber. A continuous supply of the clean fluid is slowly added to the system through drip input conduit 179 to insure that the process fluid does not enter the device. As a result, the number of times the device must be removed from the system for cleaning is substantially reduced, thereby minimizing interruptions to the operation of the process.

The diaphragm system and valve assembly provide for very accurate measurements because the movement of the diaphragm is only a few thousandths of an inch. Once pressure equilibrium is established, there is no flow of fluid within the fluid reservoir between the diaphragms.

A pressure signal is obtained at the port 52 defined in the upper body portion 14. The pressure signal is transmitted via the tube 54 to the measurement device 120. The measurement device is of the type that does not require fluid flow for operation. One such device is the capacitive pressure transducer produced by Kavlico Corporation, Chadsworth, Calif. and bearing product identification No. P614-4.

It is desirable that there should not be any leakage of air from the output chamber 24 to the remote device. In all respects, the pressure translator provides a closed system, and no air movement other than movement of the sensing element in the transducer or the gauge of the remote device should take place. If these conditions are observed, the pressure on one end of the pneumatic line 54 at the measuring instrument will be exactly equal to the pressure in the output chamber 24.

It has been determined that the pressure translator 10 is relatively insensitive to orientation. The valve assembly 60 can operate in a vertical mode, upside down, with the valve seats up or down. The only effect of rotating the valve assembly is a slight offset in the pressure, since the weight of the valve stem, the operator disc, and the fluid within the fluid reservoir act as a small offset to the process pressure. With the valve assembly in a vertical position, with the valve stem set to move in an upward direction, the offset error is negative and reduces the output signal. This error is very small but must be added to the output signal to get a true value for the process pressure. If the valve stem is set to move in a downward direction, the error is positive.

As an example, when measuring two columns of water, one 100 inches high and another 6 inches high, the results may be offset by a quarter of an inch of water in both cases when the valve stem is up. In other words, for 100 inches of water the results would be 99.75 inches and for 6 inches of water the results would be 5.75 inches. If you turn the valve upside down, it would add to the actual process pressure by a quarter of an inch of water. In other words, the two readings would be 100.25 and 6.25 inches of water instead of the actual 100 inches and 6 inches. This is a constant offset that does not vary.

Because of the structure of the pressure translator 10, the effects of temperature are basically cancelled out. A certain amount of expansion of the fluid within the fluid reservoir between the diaphragms is nulled out completely because of the balancing principle which takes place between the diaphragms.

Because of the employment of the diaphragm structure and the isolated pressure chambers 22 and 24, the pressure translator provides protection for the process. When the input diaphragm is flattened against the translator plate 12, all of the holes 28 in the translator plate are closed, thereby preventing passage of air from the output chamber 24 into the process vessel should the diaphragm 36 rupture. The pressure translator also provides protection for both the instrument used for measuring the pressure as well as the process itself. Because the pressure within the output chamber can be no greater than the pressure of the air supply, the remote measuring instrument will be protected from breakage as long as the measuring instrument is rated to withstand such pressure.

It is important that the two valve heads on the valve stem 88 be precisely adjusted to maintain a balanced air flow through the two valve seats. The reason for the balanced value is that any time there is a flow through and around the valve, movement of the air creates a drag force to pull the valve in the direction of flow. The objective of the balanced valve is to split the flow so that exactly half the air is pushing the valve down and the other half is trying to push it up. If the valve is properly adjusted, the two drag forces are cancelled out and thereby eliminate the error caused by the flow of air.

Assuming the balance valve is doing its job to nullify the flow drag forces of the air supply, then the only force that could upset the balance in the chamber would be friction caused by the valve stem touching the valve body. This error is reduced by the air flowing around the valve stem as an air bearing in the valves.

Although the present invention has been shown and described in terms of specific preferred embodiments, it will be appreciated by those skilled in the art that changes or modifications are possible which do not depart from the inventive concepts described and taught herein. Such changes and modifications are deemed to fall within the purview of these inventive concepts.

What is claimed is:

1. A pressure translator employing a test gas for use in a system for measuring the pressure of a process fluid by a pressure measuring device, said pressure translator comprising:

a main body portion having a hollow interior;

balancing means positioned within said interior to divide said interior into first and second chambers, said means operative under pressure differentials existing between said first and second chambers for increasing the volume of the chamber under higher pressure and simultaneously decreasing the volume of the chamber under lower pressure;

means for placing the process fluid in fluid communication with said first chamber;

means for placing said pressure measuring device in fluid communication with said second chamber; and valve means interposed between the source of said test gas and said second chamber, said test gas being introduced into said second chamber, said valve means continuously operative in response to said balancing means for controlling introduction of said test gas into said second chamber and for venting said test gas external of said second chamber, said valve means including an elongated valve cavity, an elongated valve stem movably mounted in said cavity, a first valve seat defined within said cavity at one end of said cavity, a second valve seat defined within said cavity at the other end of said cavity, a first valve head carried on said valve stem and associated with said first valve seat, a second valve head carried on said valve stem and associated with said second valve seat, means for continuously introducing said test gas into said valve means at a substantially constant rate, means for splitting said test gas into first and second gas flows, means for introducing said first gas flow into one end of said valve cavity, and means for introducing said second gas flow into the other end of said valve cavity and into said second chamber, said first gas flow urging said value stem toward said balancing means while said second gas flow simultaneously urges said valve stem away from said balancing means in order to maintain a balanced flow through said first and second valve seats and to create an air bearing between said valve stem and said valve cavity.

2. The pressure translator of claim 1 wherein said body portion includes a hollow cylindrical housing open at both ends, said balancing means including first chamber defining means and second chamber defining means spaced from said first chamber defining means.

3. The pressure translator of claim 2 wherein said first chamber defining means and said second chamber defining means each includes recessed portions.

4. The pressure translator of claim 3 wherein said recessed portions have different configurations.

5. The pressure translator of claim 4 wherein said body portion includes means to retain said chamber defining means axially.

6. The pressure translator of claim 5 wherein said retaining means includes biasing means to urge said chamber defining means toward each other.

7. The pressure translator of claim 6 wherein said biasing means comprises spring means.

8. The pressure translator of claim 7 wherein said spring means comprises at least one disk spring.

9. The pressure translator of claim 1 wherein said first chamber is in communication with a flushing conduit to permit the passage of flushing fluid into and through said second chamber.

10. The pressure translator of claim 1 wherein said first chamber is interconnected with said process fluid introducing means by means of U-trap conduit.

11. The pressure translator of claim 10 wherein a drip input conduit is connected to said U-trap.

12. The pressure translator of claim 11 wherein said drip input conduit includes a flow restriction and a check valve.

13. The pressure translator of claim 12 wherein said process fluid is separated from said first chamber by a buffer fluid.

14. The pressure translator of claim 1 including means to provide a clean, buffer fluid in said first chamber to avoid contamination thereof by the process fluid.

15. The pressure translator of claim 14 including means to replenish the supply of clean fluid.

16. The pressure translator of claim 1, wherein external of said second chamber is atmosphere.

17. A pressure translator employing a test gas for use in a system for measuring the pressure of a process fluid by a pressure measuring device, said pressure translator comprising:
a main body portion having a hollow interior;
balancing means positioned within said interior to divide said interior into first and second chambers, said balancing means operative under the pressure differentials between said first and second chambers for increasing the volume of the chamber under higher pressure and simultaneously decreasing the volume of the chamber under lower pressure, the volumes of said first and second chambers being constant relative to each other in the absence of a pressure differential;
means for introducing the process fluid into said first chamber;
means for placing said pressure measuring device in fluid communication with said second chamber;
an elongated valve cavity;
an elongated valve stem movably mounted in said valve cavity;
a first valve seat defined within said cavity and associated with one end of said elongated cavity;
a second valve seat associated with the other end of said cavity;
a first valve head carried on said valve stem and associated with said first valve seat;
a second valve head carried on said valve stem and associated with said second valve seat;
said valve stem responsive to the movement of said balancing means during the changes in the volume of said second chamber for moving said valve heads towards and away from their associated valve seats;
splitting means for splitting said test gas into first and second gas flows;
means for introducing said first gas flow into one end of said valve cavity; and
means for introducing said second gas flow into the other end of said valve cavity and into said second chamber, said first gas flow urging said valve stem toward said balancing means while said second gas flow simultaneously urges said valve stem away from said balancing means in order to maintain a balanced gas flow through said first and second valve seats and to create an air bearing between said valve stem and said valve cavity.

18. The pressure translator of claim 17, further comprising flow means in fluid communication with said splitting means for introducing test gas into said valve means at a constant flow rate.

19. The pressure translator of claim 18, wherein said flow means comprises a fixed orifice and said flow rate is critical flow.

20. The pressure translator of claim 17, wherein each of said first and second valve heads is shaped substantially like a sphere.

21. The pressure translator of claim 17, further comprising means for connecting said valve stem to said balancing means.

22. The pressure translator of claim 21 wherein said connecting means comprises a planar metallic disk movable under the pressure differential between said first and second chambers, and a magnet connected to one end of said valve stem, said magnet creating a magnetic coupling between said valve stem and the surface of said metallic disk.

23. The pressure translator of claim 22 including means to bias said magnet against the surface of said metallic disk.

24. The pressure translator of claim 23 wherein said biasing means comprises a spring.

25. The pressure translator of claim 17 wherein said valve cavity includes an equalizing passageway interconnecting the one end of said valve cavity with said second chamber.

26. A system utilizing a supply of test gas and a pressure measuring device for measuring the pressure of a process fluid, said system comprising:
a main body portion having a hollow interior;
translator plate means for dividing said hollow interior into first and second chambers, said plate means having a first surface facing said first chamber and a second surface facing said second chamber;
means adapted to place said pressure measuring device in fluid communication with said second chamber;
means adapted to introduce said process fluid into said first chamber;
a first diaphragm covering said first surface and creating a first volume between said first diaphragm and said first surface;
a second diaphragm covering said second surface and creating a second volume between said second diaphragm and said second surface;

flow means for creating fluid communication between said first and second volumes;

said first volume, said second volume and said flow means defining a fluid reservoir;

non-compressible fluid filling said reservoir;

said first diaphragm movable toward said first surface, when said pressure in said first chamber is greater than in said second chamber, thus causing said fluid to flow from said first volume to said second volume resulting in the movement of said second diaphragm away from said second surface, the movements of said diaphragms and said fluid being reversed when the pressure within said second chamber is greater than in said first chamber; and valve means operatively connected between said supply of test gas and said second chamber whereby said test gas is introduced into said second chamber, said valve means continuously operative in response to the movement of said second diaphragm for controlling introduction of said supply of test gas into said second chamber and for venting said test gas external to said second chamber; said valve means including an elongated valve cavity, an elongated valve stem movably mounted in said cavity, a first valve seat defined within said cavity at one end of said elongated cavity, a second valve seat defined within said cavity at the other end of said cavity, a first valve head carried on said valve stem and associated with said first valve seat, a second valve head carried on said valve stem and associated with said second valve seat;

means for introducing said test gas into said valve means at a constant rate, means for splitting said test gas into first and second gas flows, means for introducing said first gas flow into one end of said valve cavity, and means for introducing said second gas flow into the other end of said valve cavity and into said second chamber, said first gas flow urging said valve stem toward said balancing means while said second gas flow simultaneously urges said valve stem away from said balancing means in order to maintain a balanced flow through said first and second valve seats and to create an air bearing between said valve stem and said valve cavity.

27. The pressure translator of claim 26, wherein each of said first and second diaphragms are normally substantially planar.

28. The pressure translator of claim 26, wherein external of said second chamber is atmosphere.

29. A system utilizing a supply of test gas and a pressure measuring device for measuring the pressure of a process fluid, said system comprising;

a main body portion having a generally hollow interior;

a generally disk-shaped translator plate movably mounted within said interior for dividing said hollow interior into first and second cavities, said plate having a first surface facing said first cavity and a second surface facing said second cavity, said first and second surfaces being generally perpendicular to the longitudinal axis of said hollow interior;

a first movable diaphragm covering said first surface and creating a first volume between said first diaphragm and said first surface;

a second diaphragm movable independently of said first diaphragm, said second diaphragm covering said second surface and creating a second volume between said second diaphragm and said second surface;

flow means defined within said plate for providing fluid communication between said first and second volumes;

said first volume, said second volume and said flow means defining a fluid reservoir;

a non-compressible fluid filling said reservoir;

a first hollow member movably mounted within said hollow interior and defining an output chamber with the surface of said second diaphragm;

a second hollow member movably mounted within said hollow interior and defining an input chamber with the surface of said first diaphragm;

means for retaining said hollow members, said translator plate and said diaphragms in operative contact with each other;

means adapted to introduce said process fluid into said input chamber;

means adapted to place said pressure measuring device in fluid communication with said output chamber;

said first diaphragm movable toward said first surface, when said pressure in said first chamber is greater than in said second chamber, thus causing said fluid to flow from said first volume to said second volume resulting in the movement of said second diaphragms away from said second surface, the movements of said diaphragms and said fluid being reversed when the pressure within said second chamber is greater than in said first chamber; and valve means continuously responsive to the movement of said second diaphragm for controlling the introduction of said test fluid into said output chamber.

30. The pressure translator of claim 29, wherein said valve means includes rate means for introducing said fluid into said second chamber at a constant flow rate.

31. The pressure translator of claim 30, wherein said rate means comprises a fixed orifice.

32. The pressure translator of claim 29, wherein said valve means is responsive to the movement of said second diaphragm for venting said fluid external of said second chamber.

33. The pressure translator of claim 32, wherein external of said second chamber is atmosphere.

34. The pressure translator of claim 29 wherein said valve means comprises:

an elongated valve cavity;

an elongated valve stem movably mounted in said valve cavity;

a first valve seat defined within said cavity and associated with one end of said elongated cavity;

a second valve seat associated with the other end of said cavity;

a first valve head carried on said valve stem and associated with said first valve seat;

a second valve head carried on said valve stem and associated with said second valve seat;

said valve stem responsive to the movement of said second diaphragm during the changes in the volume of said second chamber for moving said valve heads toward and away from their associated valve seats;

air vent means located intermediate between said ends of said elongated cavity, the movement of said valve stem regulating the passage of said test gas to atmosphere;

splitting means for splitting said test gas into first and second gas flows;

means for introducing said first gas flow into one end of said valve cavity; and means for introducing said second gas flow into the other end of said valve cavity and into said second chamber, said first gas flow urging said valve stem toward said balancing means while second gas flow simultaneously urges said valve stem away from said balancing means in order to maintain a balanced air flow through said first and second valve seats and to create an air bearing between said valve stem and said valve cavity.

35. A system employing a test fluid for measuring the pressure of a process fluid, said system comprising:

a main body portion having a hollow interior;

balancing means positioned within said interior to divide said interior into first and second chambers, said means operative under pressure differentials existing between said first and second chambers for increasing the volume of the chamber under higher pressure and simultaneously decreasing the volume of the chamber under lower pressure, said balancing means having a planar metallic disk movable in response to said pressure differentials;

means for introducing the process fluid into said first chamber;

means for placing said pressure measuring device in fluid communication with said second chamber; and valve means interposed between the source of said test fluid and said second chamber, said valve means continuously operative in response to said balancing means for introducing said test fluid into said second chamber and for venting said test fluid external of said second chamber, said valve mean including an elongated valve cavity, at least one valve seat defined within said cavity, at least one valve head associated with said valve seat, an elongated valve stem carrying said valve head, said valve stem movable in all directions within said cavity to permit movement of said valve head toward and away from said valve seat, and a magnetic member coupled to one end of said stem for magnetically coupling said stem to a surface of said planar metallic disk, the magnetic properties of said magnetic member being chosen to permit some lateral movement of said magnetic member about the surface of said metallic disk and so that said magnetic member remains in contact with the surface of said metallic disk during movement of said valve stem within said cavity.

* * * * *